United States Patent
Natori

(10) Patent No.: US 8,792,310 B2
(45) Date of Patent: Jul. 29, 2014

(54) MULTITRACK RECORDER

(71) Applicant: TEAC Corporation, Tama (JP)

(72) Inventor: Ikuomi Natori, Tama (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 13/752,790

(22) Filed: Jan. 29, 2013

(65) Prior Publication Data

US 2014/0056119 A1    Feb. 27, 2014

(30) Foreign Application Priority Data

Aug. 24, 2012   (JP) ................................ 2012-185479

(51) Int. Cl.
*H04B 1/20* (2006.01)
*G11B 7/20* (2006.01)

(52) U.S. Cl.
USPC ................ 369/4; 369/95; 369/92; 700/94

(58) Field of Classification Search
USPC ............... 369/92, 275.3, 47.28, 47.3, 124.14, 369/59.1, 94, 4; 84/603, 602; 381/81, 119, 381/109, 123, 17; 359/901; 700/94
See application file for complete search history.

(56) References Cited

U.S. PATENT DOCUMENTS

| | | | | |
|---|---|---|---|---|
| 6,208,800 | B1 * | 3/2001 | Katsuyama et al. | 386/291 |
| 6,343,054 | B1 * | 1/2002 | Maeda | 369/47.32 |
| 7,308,324 | B2 * | 12/2007 | Ono | 700/94 |
| 7,343,210 | B2 * | 3/2008 | DeVito et al. | 700/94 |
| 7,826,318 | B2 * | 11/2010 | Holden et al. | 369/47.28 |
| 8,301,280 | B2 * | 10/2012 | Sekido et al. | 700/94 |
| 8,625,400 | B1 * | 1/2014 | Terai | 369/95 |
| 2012/0221132 | A1 * | 8/2012 | Sekido et al. | 700/94 |
| 2013/0051207 | A1 * | 2/2013 | Yoshinari et al. | 369/92 |
| 2014/0056115 | A1 * | 2/2014 | Natori | 369/4 |

FOREIGN PATENT DOCUMENTS

JP    2007165984 A    6/2007

* cited by examiner

*Primary Examiner* — Ali Neyzari

(74) *Attorney, Agent, or Firm* — Seed IP Law Group PLLC

(57) ABSTRACT

A multitrack recorder can allocate an input source in a simple manner without regard to whether a track is a monaural type or a stereo type. The multitrack recorder can set tracks 3 and 4, among a plurality of tracks 1 through 4, to either a monaural type or a stereotype. Track types are stored in memory. On occasion of allocation of an input source to each of the tracks, available input source alternatives are displayed in a display section while being changed according to whether the track is a monaural type or a stereo type.

6 Claims, 3 Drawing Sheets

MULTITRACK RECORDER

PRIORITY INFORMATION

This application claims priority to Japanese Patent Application No. 2012-185479, filed on Aug. 24, 2012, which is incorporated herein by reference in its entirety.

BACKGROUND

1. Technical Field

The invention relates to a multitrack recorder that records a sound signal in a plurality of tracks.

2. Related Art

A hitherto-known multitrack recorder records a sound signal into a plurality of tracks. A multitrack recorder makes it possible to record a rhythm guitar part in a track 1 and a lead guitar part in a track 2 by use of; for instance, an electric guitar and a vocal sound in a track 3 by use of a built-in microphone and mix down them to thereby generate and record a stereo signal.

It is desirable that the multitrack recorder be able to record a sound signal in as many tracks as possible. In the meantime, when an attempt is made to make the multitrack recorder compact in consideration of portability, limiting the number of tracks might be unavoidable. Measures that are conceivable in the circumstances are to limit the number of tracks to a certain number; for instance, four and make some of the tracks assignable to either a monaural type or a stereo type rather than fixing the tracks solely to monaural types to enhance user's convenience.

JP 2007-165984 A describes technology intended for performing more diverse sound pickup operations. Performing diverse sound pickup operations would be effected only by a combination of directions of main axes of a plurality of directional microphones whose main axes can be independently changed with a sound signal processing device.

In a configuration in which the number of tracks is limited to a constant value and in which some of the tracks can be set to either a monaural type or a stereo type, an input source must be switched according to a track type. Specifically, when a track in which a sound signal is to be recorded is of a monaural type, one input source conforming to the monaural type is set. In the meantime, when a track in which a sound signal is to be recorded is of a stereo type, a plurality of input sources conforming to the stereo type must be set. However, in this case, the user must correctly grasp which track is set to a monaural type or a stereo type. Thus, an oversight of settings or a setting failure could occur. As a matter of course, there is also available a configuration that makes it possible for the user to switch a screen to a dedicated screen to ascertain a type of each track in each case. However, the configuration would be troublesome and deteriorate operability.

SUMMARY

The invention enables easy, reliable setting of an input source appropriate for a track type in a multitrack recorder that can set at least some of a plurality of tracks to a monaural type or a stereo type.

The invention is directed toward a multitrack recorder that records sound signals into a plurality of tracks and that is characterized by comprising setting means capable of setting at least any of the plurality of tracks to either a monaural track type or a stereo track type; storage means that stores the track types set by the setting means; and control means that assigns an input source to each of the tracks and that submits an allocable input source after changing it between a monaural type and a stereo type according to the track types stored in the storage means.

In an embodiment of the invention, the control means is characterized by submitting a sole input source as an allocable input source in the case of a monaural track and also submitting a pair consisting of two input sources as an allocable input source in the case of a stereo track.

In another embodiment of the invention, the multitrack recorder further comprises a first built-in microphone and a second built-in microphone as an allocable input source, wherein the control means submits the first built-in microphone or the second built-in microphone as an allocable input source in the case of a monaural track and also submits the first built-in microphone and the second built-in microphone as an allocable input source in the case of a stereo track.

In still another embodiment of the invention, the multitrack recorder further comprises a first input port and a second input port as an allocable input source, wherein the control means submits the first input port or the second input port as an allocable input source in the case of a monaural track and submits the first input port and the second input port as an allocable input source in the case of a stereo track.

According to the invention, an allocable input source is automatically submitted according to a track type. Therefore, an input source can be simply, reliably allocated regardless of a track type. Enhanced operability and a reduction in user's burden are achieved, and occurrence of an erroneous setting of an input source, or the like, is prevented.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the invention is hereunder described by reference to the drawings.

Figure 1:
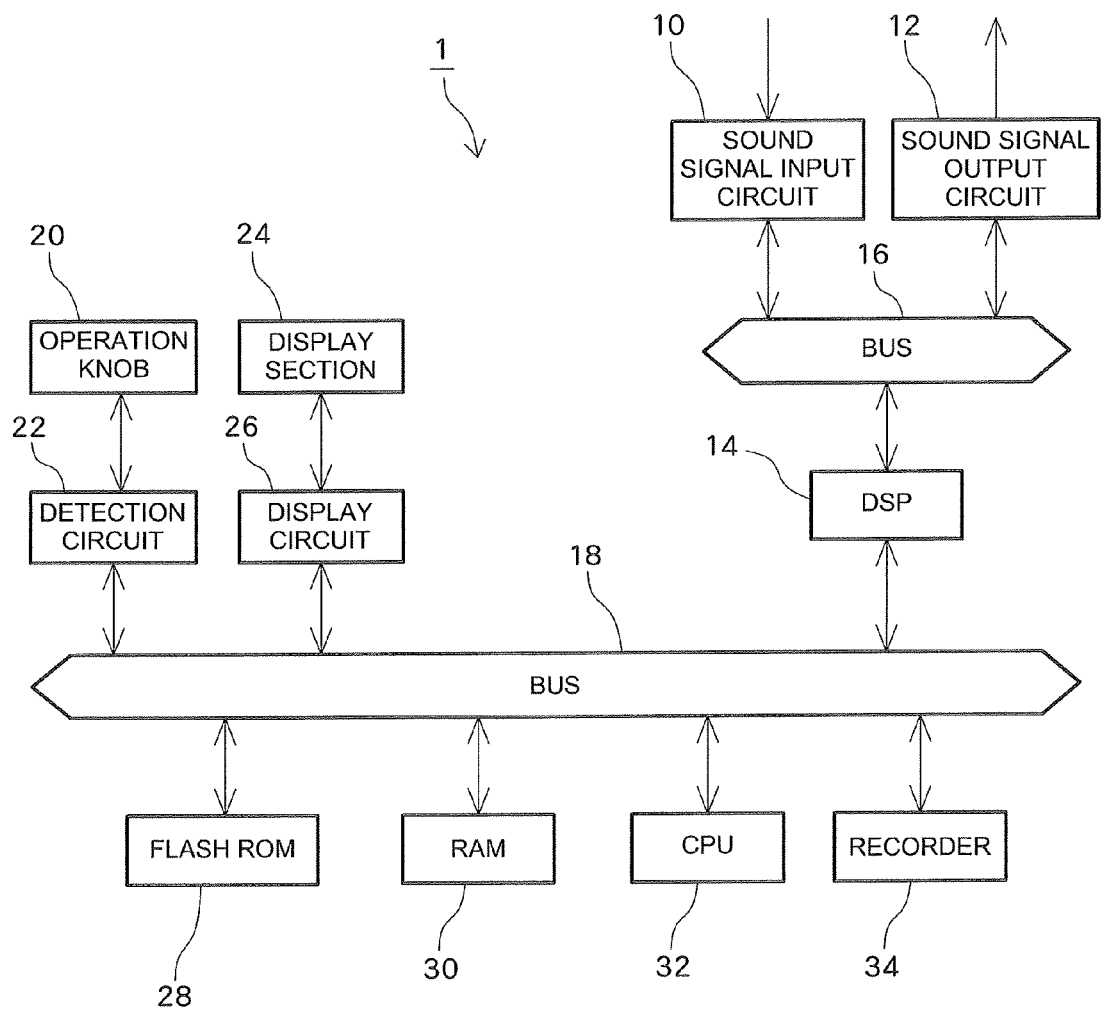
FIG. 1 is a block diagram of a multitrack recorder of an embodiment.

FIG. 1 is a block diagram of a multitrack recorder 1 of the embodiment. A sound signal input circuit 10 has a plurality of input ports and is provided with inputs of sound signals from a plurality of sound generators (sources). Exemplifications of the plurality of sound signals include a guitar sound, a vocal sound, a drum sound, and the like. In the embodiment, the sound signal input circuit 10 has two built-in microphones and two input ports and is provided with inputs of sound signals. The built-in microphones and the input ports are switchable. A sound signal input by way of the sound signal input circuit 10 is fed to a DSP (Digital Signal Processor) 14 by way of a bus 16.

Under control of a CPU 32, the DSP 14 subjects sound signals of a plurality of channels, which are fed from the sound signal input circuit 10, to various digital processing; for instance, effect processing, equalizing, or mixing, and are recorded in the recorder 34 by way of the bus 18. A recording medium of the recorder 34 is an optical disc, including a CD-R/RW and a DVD-R/RW, a hard disc drive, a flash memory medium, and the like. Processing of the DSP 14 also includes processing for controlling PAN and a volume level of each of the sound signals according to manipulation of operation knobs 20.

The operation knobs 20 are disposed on an operation surface of the multitrack recorder 1. The operation knobs 20 are made up of various key switches, a selection button, a menu button, a determination button, a PAN knob, a level knob, and others. The user assigns an individual sound signal to at least one track of a plurality of tracks by manipulating the operation knobs 20. A detection circuit 22 detects a state of manipulation of the operation knobs 20. The detection circuit 22 supplies a manipulation status detection signal pertaining to the operation knobs 20 to the CPU 32 by way of the bus 18.

The CPU 32 collectively controls an entirety of the multitrack recorder. According to a program stored in flash ROM 28, the CPU 32 performs various processing by use of RAM 30 serving as working memory. Specifically, respective sound signals of a plurality of channels are assigned to at least any of the plurality of tracks according to the operation status detection signal from the detection circuit 22. For instance, when there are tracks from a track 1 to a track 4, a channel A is assigned to the track 1; a channel B is assigned to the track 2; and a channel C is assigned to the track 4. In the embodiment, a correlation between channels and tracks resulting from assignment of the respective channels to the respective tracks is referred to as "assignment information." The CPU 32 supplies various information to a display circuit 26. The display circuit 26 displays various information on a display section 24.

The CPU 32 commands the display circuit 26 to display a variety of menu screens and a setting screen in compliance with user's manipulation of the operation knobs 20. According to information from the CPU 32, the display circuit 26 displays the menu screen and the setting screen on the display section 24. The menu screens include one for assigning each of the tracks 1 through 4 to either a monaural type or a stereo type. In the embodiment, at least any of the tracks 1 through 4 is configured so as to be selectable between a monaural type and a stereo type. The user sets a desired track to either a monaural type or a stereo type. In the multitrack recorder of the embodiment, the track 1 and the track 2 are set to monaural types, and the track 3 and the track 4 can be set to either a monaural type or a stereo type. The setting screen includes one for replicating (cloning or copying) the sound signal recorded in a certain track to another track. The user manipulates the operation knobs 20 on the setting screen, thereby selecting a source track and a destination track.

The CPU 32 commands the display circuit 26 to display a level of the sound signal assigned to each of the tracks in the form of a bar chart (a level meter), and the display circuit 26 displays a level meter image on the display section 24 in accordance with information from the CPU 32.

Moreover, the CPU 32 reads a sound signal recorded in the recorder 34 in conformance with the operation status detection signal from the detection circuit 22 and feeds the signal to the DSP 14. The DSP 14 outputs a sound signal to the outside by way of the bus and the sound signal output circuit 12. The sound output circuit 12 has various output ports, such as an analogue output port and a digital output port.

Figure 2:
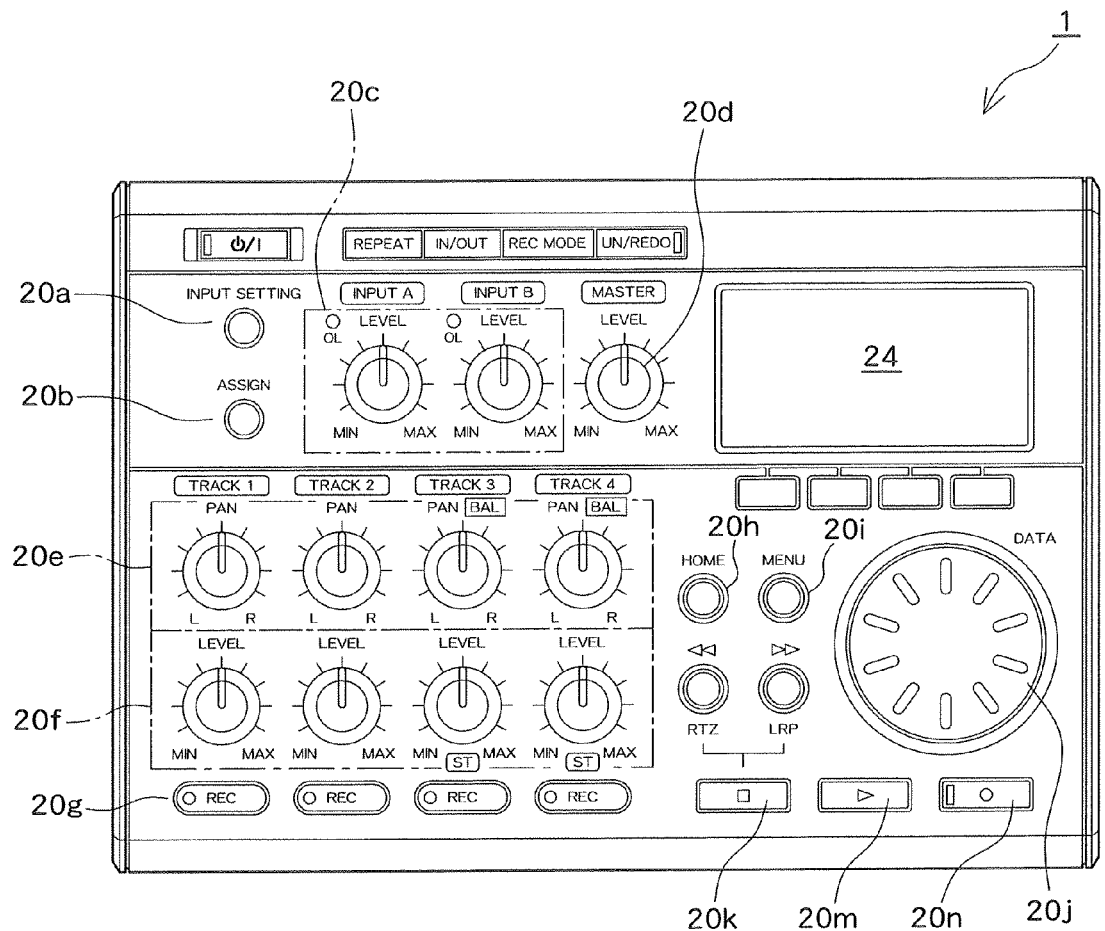
FIG. 2 is a plan view of the multitrack recorder of the embodiment.
Figure 3:
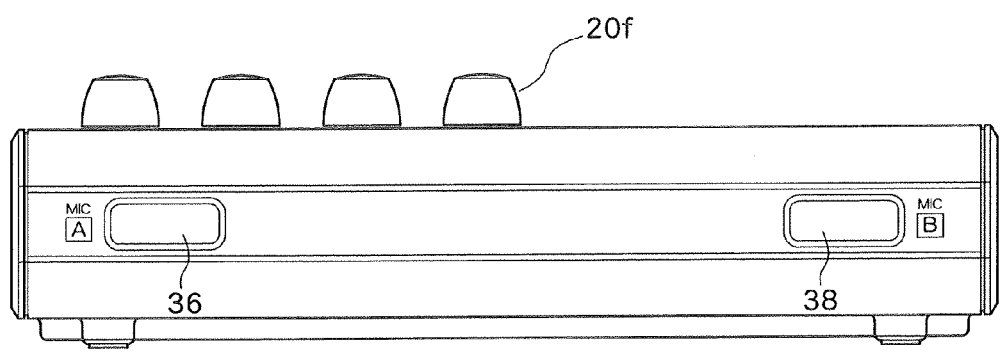
FIG. 3 is a front view of the multitrack recorder of the embodiment.
Figure 4:
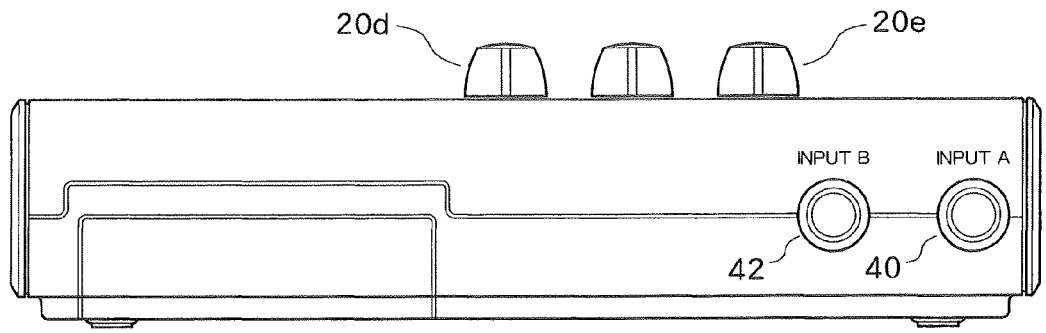
FIG. 4 is a rear view of the multitrack recorder of the embodiment.

FIG. 2 shows a plan view of the multitrack recorder 1 of the embodiment. FIGS. 3 and 4 show a front view and a rear view of the multitrack recorder, respectively.

The operation surface of the multitrack recorder 1 is provided with the variety of operation knobs 20 and the display section 24. The operation knobs 20 include an input setting key 20a, an assign key 20b, an input channel level knob 20c, a master level knob 20d, a PAN knob 20e, a level knob 20f, a recording function key 20g, a home key 20h, a menu key 20i, a data wheel 20j, a stop key 20k, a playback key 20m, and a record key 20n.

The input setting key 20a is one for selecting an input source. The user switches an input source between a built-in microphone and an input port by manipulating the key. The multitrack recorder 1 of the embodiment has two input channels; namely, an input A and an input B, as represented by an input channel level knob 20c to be described later. Thus, an input source can be individually switched for each input channel. Specifically, switching between the built-in microphone and the input port can be made in relation to the input A channel, and switching between the built-in microphone and the input port can be made even in connection with the input B channel.

The assign key 20b is for assigning an input sound signal to each of the tracks 1 through 4. The user manipulates the key, to thus assign and record a sound signal to each track.

The input channel level knob 20c is one for controlling a level of each of the input sources. The user controls a level of each of the input sources by manipulating the knob. For instance, when an input source of the input A channel is set to a built-in microphone, a level of a sound signal input from the built-in microphone is controlled by use of the knob.

The master level knob 20d is one for controlling a monitor level of a stereo output signal.

The PAN knob 20e is one provided for each of the track 1 to the track 4 and controlling a normal position (PAN) for stereo mix of the sound signal of each of the tracks.

The level knob 20f is provided for each of the track 1 to the track 4 and controlling a level of a sound signal of each of the tracks.

The recording function key 20g is provided for each of the track 1 to the track 4. A track of interest shifts to a record standby state by user's manipulation of the recording function key 20g. When the playback key 20m and the record key 20n are manipulated in the record standby state, a sound signal is recorded in the track that is in the record standby state.

The home key 20h is one for displaying a home screen on the display section 24. The home screen is a basic screen of the multitrack recorder 1 and appears immediately after power of the multitrack recorder 1 is turned on. When the home key 20h is manipulated in the middle of appearance of another screen, the home screen is displayed on the display section 24. The home screen displays a recorder motor and its power status, a transport status of the recorder, a time counter of the recorder, a status and a level meter of each of the tracks 1 to 4, stereo output level meters, and others.

The menu key 20i is one for displaying a menu screen on the display section 24. The menu screen includes information, track edition, a data backup, a tuner, and others. The track edition includes a clone track, cleanout, silence, a cut, open, and others. The clone track is a menu for replicating a track, and cleanout is a menu for deleting a track. Silence is a menu for partially deleting a track. Cut is a menu for partially deleting a track. Open is a menu for inserting silence.

The data wheel 20*j* is one for changing a value of each of the parameters or selecting an item by means of menu manipulation.

In the meantime, as shown in the front view of FIG. 3, built-in microphones 36 and 38 are disposed on both sides of the front of the multitrack recorder 1. The built-in microphones 36 and 38 are usually used as right and left microphones; namely, the built-in microphone 36 for an L channel and the built-in microphone 38 for an R channel, during stereo recording operation. However, use of the built-in microphones 36 and 38 is not limited to the way mentioned above. Only either the built-in microphone 36 or the built-in microphone 38 can be used. Alternatively, the built-in microphone 36 can be used for an R channel, and the built-in microphone 38 can be used for an L channel. Levels of the sound signals input from the built-in microphones 36 and 38 are controlled by means of the input channel level knob 20*c*.

Moreover, as shown in a rear view of FIG. 4, input ports 40 and 42 are provided on a rear surface of the multitrack recorder 1. Levels of sound signals input by way of the input ports 40 and 42 are likewise controlled with the input channel level knob 20*c*.

The user can select a desired channel and a desired track by use of the operation knobs 20 and assign a sound signal to a desired track. For instance, the input port 40 is selected as the input A channel, and a guitar sound signal is input. The input port 42 is selected as the input B channel, and a drum sound signal is input. Assignment is set as follows by use of the assign key 20*b*.

Channel A (a guitar sound signal)—Track 1
Channel B (a drum)—Track 2

Assignment information is stored in the RAM 30. The user sets the track 3 and the track 4 by switching them to a monaural type or a stereo type, by use of the operation knobs 20. For instance, the following are set:

Track 3—stereo
Track 4—monaural

Specifically, each of the track 3 and the track 4 is made up of two channels. When the track is set to a monaural type, only one of the two channels is enabled. In contrast, when the track is set to a stereo type, both of the two channels are enabled and set as an L channel and an R channel, respectively. Accordingly, when the track 3 is set to a stereo type, an L channel sound signal and an R channel sound signal are recorded in the track 3.

Setting each of the tracks 3 and 4 to either a monaural type or a stereo type and track edition and setting of an input source in the embodiment are now described specifically.

Figure 5:
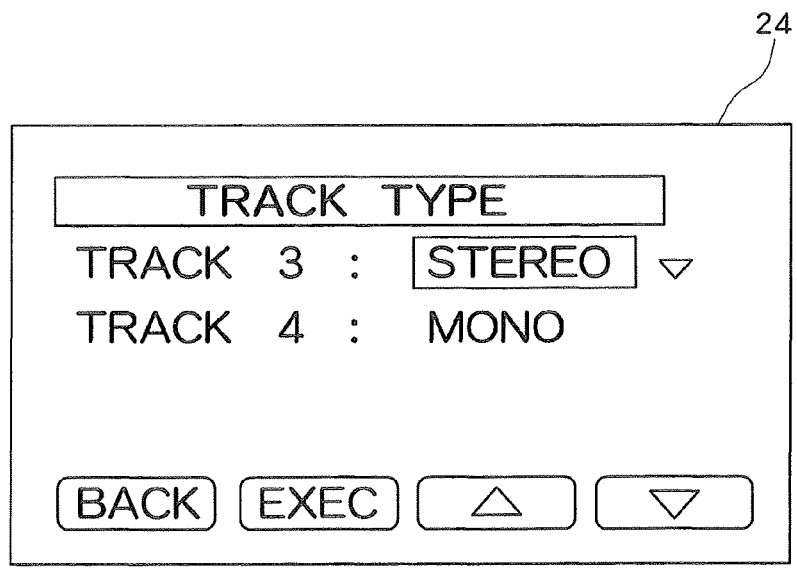
FIG. 5 is a descriptive view showing a track type setting screen.

FIG. 5 shows an exemplification of a screen that appears on the display section 24 when the user selects a track type by manipulating the menu key 20*i* and the data wheel 20*j*. In response to manipulation of the menu key 20*i* and the data wheel 20*j*, the CPU 32 displays on the display section 24 a setting screen as to whether to set the track 3 and the track 4 to a monaural type or a stereo type. Alternatives, or monaural and stereo, for the respective tracks 3 and 4 are displayed on the screen. The user manipulates the data wheel 20*j*, to thus make a choice. FIG. 5 shows a case where the user sets the track 3 to a stereo type and the track 4 to a monaural type. Type information about the track 3 and the track 4 is stored in the RAM 30. Since the track 1 and the track 2 are fixed to a monaural type, information about their types does not need to be stored in the RAM 30. However, information about types of all the tracks 1 through 4 can also be collectively stored in the RAM 30 as a table. Suppose a monaural identifier is taken as M and a stereo identifier is taken as S, the followings are obtained when only the track 3 is set to a stereo type.

Track 1: M
Track 2: M
Track 3: S
Track 4: M

When the user manipulates the input setting key 20*a*, the CPU 32 displays an input setting screen in the display section 24 in response to manipulation.

Figure 6:
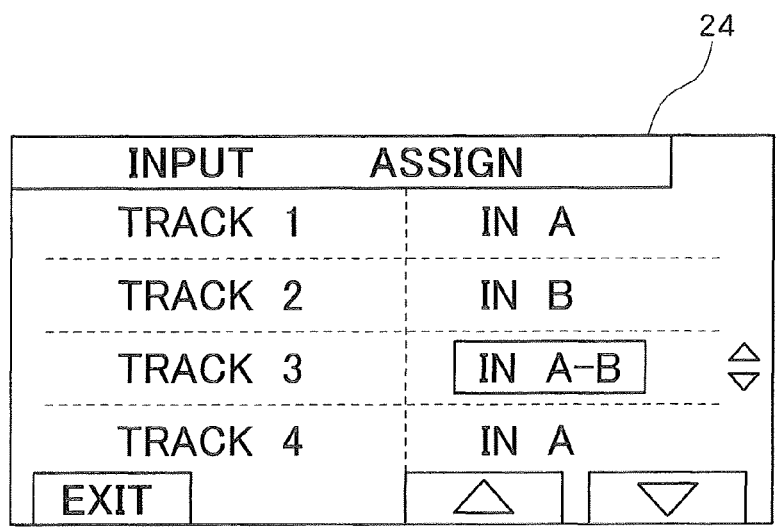
FIG. 6 is a descriptive view showing an input source setting screen.

FIG. 6 shows an exemplification of an input setting screen appearing on the display section 24. Alternatives that can be selected as input sources are displayed for each of the tracks 1 through 4. The screen is based on the premise that input sources of both the input A channel and the input B channel are already set to either a built-in microphone or an input port. Suppose both of the channels are set to; for instance, a built-in microphone. Moreover, as shown in a front view of FIG. 3, a built-in microphone at user's left hand is taken as A, and another built-in microphone at user's right hand is taken as B.

The track 1 is a monaural track and can be assigned only one source as an input source. On the basis of the fact that the track 1 is of a monaural type, the CPU 32 displays the microphone A and the microphone B as alternatives in a selectable manner. The drawing shows that the microphone A is selected and set.

The track 2 is a monaural track and can be assigned only one source as an input source. On the basis of the fact that the track 2 is of a monaural type, the CPU 32 displays the microphone A and the microphone B as alternatives in a selectable manner. The drawing shows that the microphone B is selected and set.

The track 3 is set to a stereo type and must be assigned two sources as input sources. Therefore, on the basis of the fact that the track 3 is of a stereo type, the CPU 32 displays only a combination of the microphone A and the microphone B as alternatives. Symbol IN A-B in the drawing means that the microphone A is assigned to the L channel of the track 3 and that the microphone B is assigned to the R channel of the same. Since the user can select only the combination of the microphone A and the microphone B (i.e., a pair of microphones), the combination is selected and set. This makes it possible to prevent occurrence of a setting failure, such as selecting solely the microphone A or the microphone B in spite of the fact that the track 3 is a stereo track.

The track 4 is set to a monaural type and can be assigned only one source as an input source. Hence, the CPU 32 displays the microphone A and the microphone B as alternatives in a selectable manner in response to the fact that the track 4 is of a monaural type. The drawing shows that the microphone A is selected and set.

As above, in the embodiment, the CPU 32 automatically displays in the display section 24 available input source alternatives in accordance with a track type, by reference to the types of the tracks 1 through 4 stored in the RAM 30. Hence, all the user has to do is to select a desired input source from among the available alternatives. Hence, setting an input source is facilitated. In particular, even when only a specific track of the tracks 1 through 4 (e.g., the track 3 in the embodiment) is set to a stereo track, the CPU 32 automatically changes and displays alternatives according to the track types, forgetting to set an input source and an erroneous setting can be prevented without fail.

In the embodiment, explanations are given to a case where only the track 3 is set to a stereo type. However, needless to say, alternatives are automatically changed according to track types in the same manner even when only the track 4 is set to a stereo type or when both the track 3 and the track 4 are set to a stereo type.

Alternatives conforming to track types are enumerated as follows.

When the track type is a monaural type: Microphone A or microphone B

When the track type is a stereo type: Pair of microphone A and microphone B

Incidentally, when the track type is a stereotype, another combination of the microphone B taken as the L channel and the microphone A taken as the R channel is also available in addition to the combination of the microphone A taken as the L channel and the microphone B taken as the R channel. Alternatively, there are also available a combination of the microphones A taken as the L and R channels and a combination of the microphones B taken as the L and R channels. Therefore, when the track type is a stereo type, the CPU 32 can also display alternatives as follows:

A pair consisting of the microphone A and the microphone B (as designated by symbol IN A-B in FIG. 6).

A pair consisting of the microphone B and the microphone A (as indicated by symbol IN B-A in FIG. 6).

A pair consisting of the microphone A and the microphone A (as designated by symbol IN A-A in FIG. 6).

A pair consisting of the microphone B and the microphone B (as indicated by symbol IN B-B in FIG. 6).

Although the multitrack recorder having the tracks 1 through 4 is exemplified in the embodiment, the invention is not limited to the multitrack recorder. The invention can also be applied likewise to another multitrack recorder having five or more tracks.

In the embodiment, the types of the tracks 3 and 4 or the types of all the tracks 1 through 4 are stored in the RAM 30. However, the track types can also be stored in nonvolatile memory, such as the flash ROM 28, and information about the track types can also be retained even after power of the multitrack recorder is turned off.

Although the case where the input source is a built-in microphone has been described in the embodiment, the same also applies to an input port. All you need to do is to replace the microphone A with an input port A and replace the microphone B with an input port B.

What is claimed is:

1. A multitrack recorder that records sound signals into a plurality of tracks, comprising:

setting means capable of setting at least any of the plurality of tracks to either a monaural track type or a stereo track type;

storage means that stores the track types set by the setting means; and control means that assigns an input source to each of the tracks and that submits an allocable input source after changing the allocable input source between a monaural type and a stereo type according to the track types stored in the storage means.

2. The multitrack recorder according to claim 1, wherein the control means submits a sole input source as an allocable input source in the case of a monaural track and also submits a pair consisting of two input sources as an allocable input source in the case of a stereo track.

3. The multitrack recorder according to claim 2, further comprising:

a first built-in microphone and a second built-in microphone as an allocable input source, wherein the control means submits the first built-in microphone or the second built-in microphone as an allocable input source in the case of a monaural track and also submits the first built-in microphone and the second built-in microphone as an allocable input source in the case of a stereo track.

4. The multitrack recorder according to claim 3, wherein the control means further submits a pair of first built-in microphones or a pair of second built-in microphones as an allocable input source in the case of a stereo track.

5. The multitrack recorder according to claim 2, further comprising:

a first input port and a second input port as an allocable input source, wherein the control means submits the first input port or the second input port as an allocable input source in the case of a monaural track and submits the first input port and the second input port as an allocable input source in the case of a stereo track.

6. The multitrack recorder according to claim 5, wherein the control means further submits a pair of first input ports or a pair of second input ports as an allocable input source in the case of a stereo track.

* * * * *

UNITED STATES PATENT AND TRADEMARK OFFICE
CERTIFICATE OF CORRECTION

PATENT NO.        : 8,792,310 B2                                 Page 1 of 1
APPLICATION NO.   : 13/752790
DATED             : July 29, 2014
INVENTOR(S)       : Ikuomi Natori It is certified that error appears in the above-identified patent and that said Letters Patent is hereby corrected as shown below:

On the Title Page

Item (71): Applicants:
"TEAC Corporation, Tama (JP)" should read, --TEAC Corporation, Tokyo (JP)--.

Item (72): Inventor:
"Ikuomi Natori, Tama (JP)" should read, --Ikuomi Natori, Tokyo (JP)--.

Item (73): Assignee:
"Teac Corporation, Tokyo (JP)" should read, --TEAC Corporation, Tokyo (JP)--.

Item (57): Abstract:
"A multitrack recorder can allocate an input source in a simple manner without regard to whether a track is a monaural type or a stereo type. The multitrack recorder can set tracks 3 and 4, among a plurality of tracks 1 through 4, to either a monaural type or a stereotype. Track types are stored in memory. On occasion of allocation of an input source to each of the tracks, available input source alternatives are displayed in a display section while being changed according to whether the track is a monaural type or a stereo type." should read, --A multitrack recorder can allocate an input source in a simple manner without regard to whether a track is a monaural type or a stereo type. The multitrack recorder can set tracks 3 and 4, among a plurality of tracks 1 through 4, to either a monaural type or a stereo type. Track types are stored in memory. On occasion of allocation of an input source to each of the tracks, available input source alternatives are displayed in a display section while being changed according to whether the track is a monaural type or a stereo type.--.

Signed and Sealed this
Twenty-seventh Day of January, 2015

Michelle K. Lee
*Deputy Director of the United States Patent and Trademark Office*